Dec. 12, 1950
C. E. PAULEY
2,533,837
VEHICLE BUMPER AND ADJUSTABLE PIPE RACK
Filed Oct. 8, 1948
2 Sheets-Sheet 1
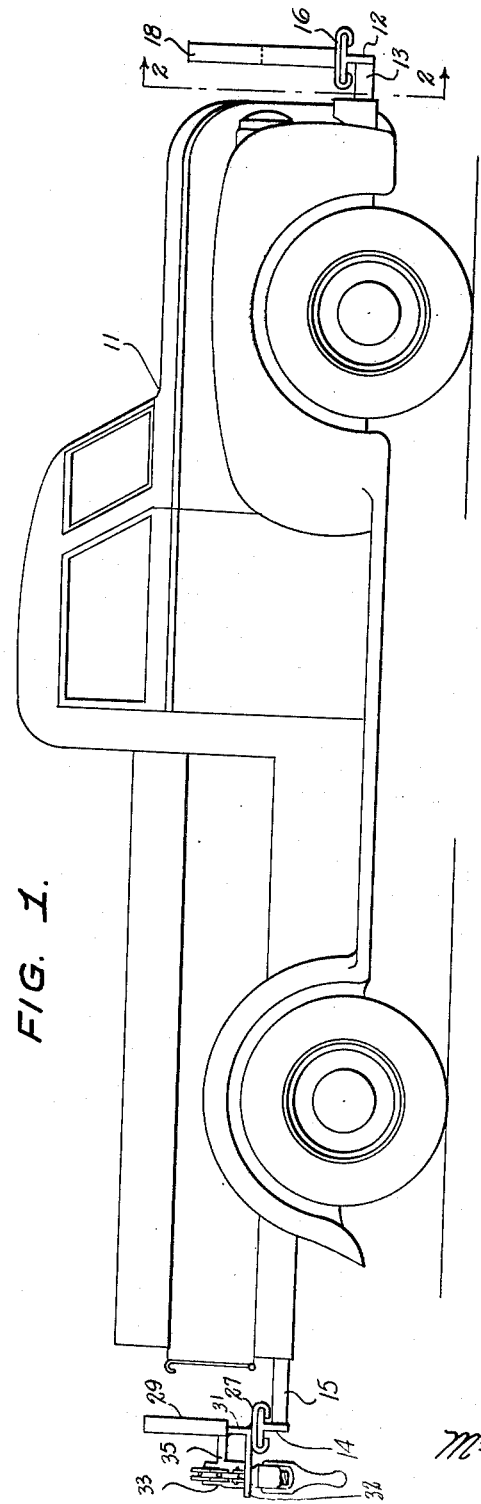
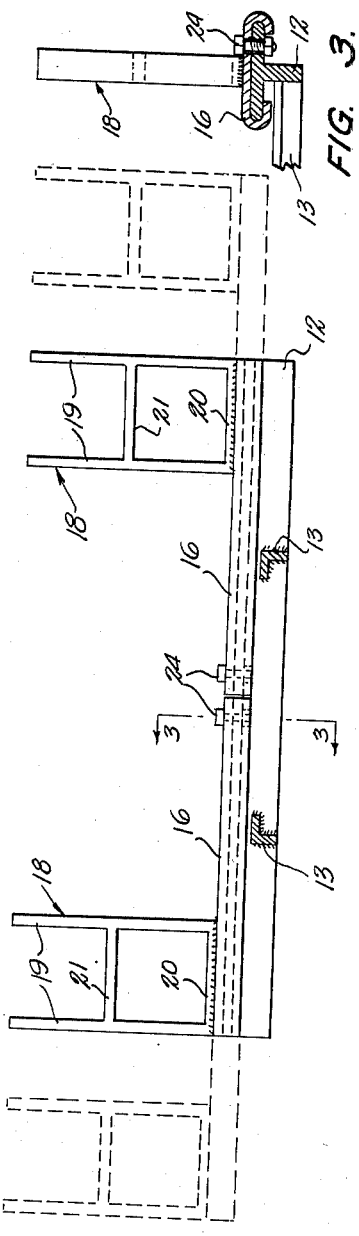
INVENTOR.
CLARENCE E. PAULEY,
BY
McMorrow, Berman + Davidson
ATTORNEYS.

Dec. 12, 1950
C. E. PAULEY
2,533,837
VEHICLE BUMPER AND ADJUSTABLE PIPE RACK
Filed Oct. 8, 1948
2 Sheets-Sheet 2
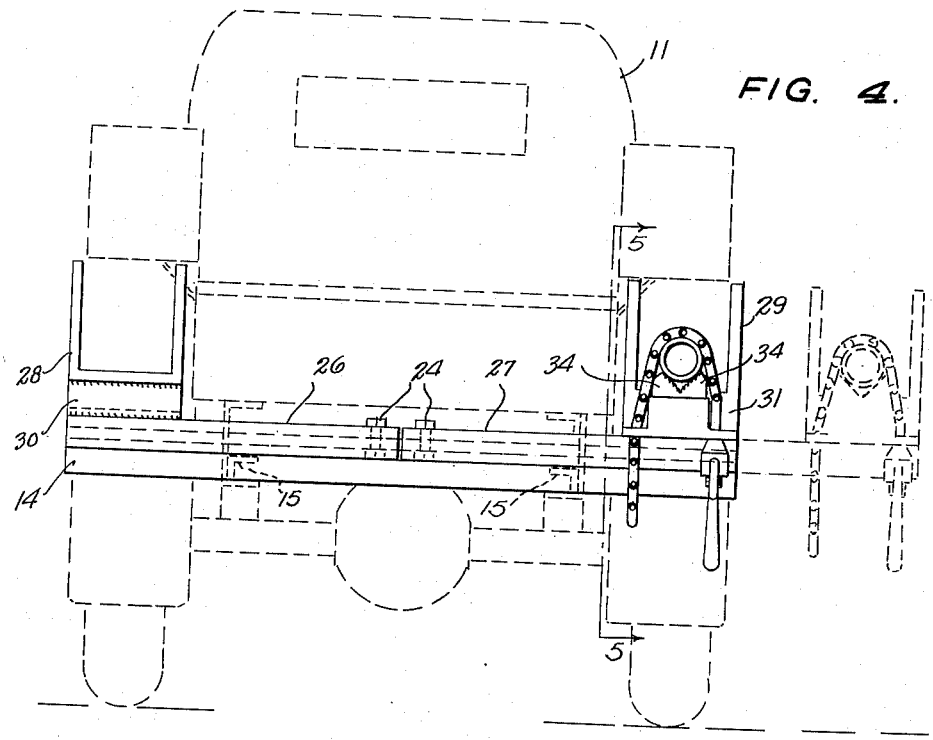
FIG. 4.
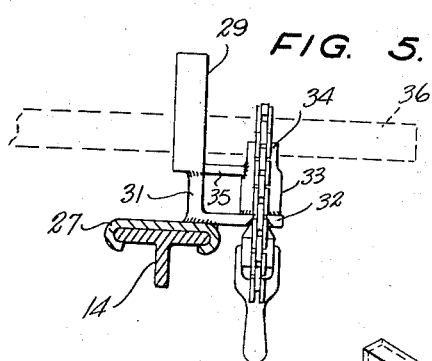
FIG. 5.
FIG. 6.
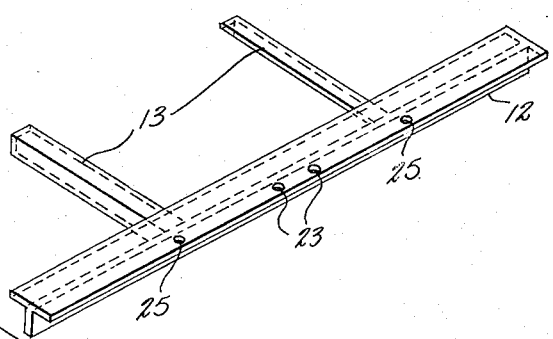
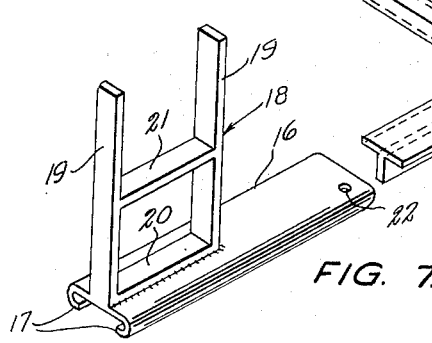
FIG. 7.
INVENTOR.
CLARENCE E. PAULEY,
BY
McMorrow, Berman & Davidson
ATTORNEYS.

Patented Dec. 12, 1950

2,533,837

UNITED STATES PATENT OFFICE 2,533,837

VEHICLE BUMPER AND ADJUSTABLE PIPE RACK

Clarence E. Pauley, Hopkinsville, Ky.

Application October 8, 1948, Serial No. 53,554

2 Claims. (Cl. 293—69)

This invention relates to pipe supports for vehicles, and more particularly to means adapted for attachment to motor trucks for supporting pipes and the like for transportation.

A main object of the invention is to provide a novel and improved adjustable pipe rack and vise for motor trucks, which involves only a few parts, is easy to install, which enables lengths of pipe to be hauled in substantial quantity by a truck without damaging parts of the truck body, and which also embodies means for holding a length of pipe while it is being cut or threaded.

A further object of the invention is to provide an improved adjustable pipe rack and vise for motor trucks which imposes no strain on the truck fenders when in use, which has pipe-supporting elements adjustable from an inoperative position inward of the plane of the fenders to an operative position spaced outwardly from the plane of the fenders, so that said fenders are protected against damage from pipe lengths supported on said elements, and which greatly increase the usefulness of the motor truck by enlarging its pipe-carrying capacity.

Further objects and advantages of the invention will become apparent from the following description and claims, and from the accompanying drawings, wherein:

Figure 1 is a side elevational view of a motor truck equipped with a pipe rack and vise structure in accordance with the present invention.

Figure 2 is an enlarged cross-sectional view taken on line 2—2 of Figure 1.

Figure 3 is an enlarged fragmentary detail view taken on line 3—3 of Figure 2.

Figure 4 is a rear view of the truck of Figure 1.

Figure 5 is a cross-sectional detail view taken on line 5—5 of Figure 4.

Figure 6 is a perspective detail view showing the front bumper element of the truck.

Figure 7 is a perspective detail view showing one of the front bumper adjustable pipe supporting members.

Referring to the drawings, 11 designates a motor truck which is generally conventional in construction except that it has a front bumper 12 which is T-shaped in cross-section and which is rigidly secured to the front end of the truck frame by a pair of angle bars 13, 13, and a rear bumper 14, likewise T-shaped in cross-section, which is rigidly secured to the rear end of the truck frame by angle bars 15, 15.

Slidably mounted on the top flange of front bumper 12 are a pair of sleeve members 16, 16, each sleeve member having the inturned bottom flanges 17, 17 engaging beneath the bottom surfaces of the top flange of the bumper. Secured to the outer portion of each sleeve member 16 is an upstanding support bracket 18 comprising vertical side bars 19, 19 connected by a bottom bar 20 and by an intermediate cross-bar 21. The inner end portion of each sleeve member 16 is formed with an aperture 22. The top flange of bumper 12 is formed at its mid-portion with respective apertures 23, 23 registerable with the apertures 22 of the sleeve members when said sleeve members are retracted inwardly to substantially abutting positions on the bumper 12, as shown in Figure 2. Bolts 24, 24 are provided which are engageable through the registering apertures 22 and 23 for securing the sleeve members in retracted positions. The sleeve members may be moved to outwardly extended positions wherein the openings 22 register with respective openings 25, 25 formed in the top flange of bumper 12, whereby the bolts 24 may be employed to secure said sleeve members in their extended positions.

The rear bumper 14 is similarly provided with sleeve members 26 and 27 carrying respective upstanding U-shaped support brackets 28 and 29 at their outer end portions. The sleeve members 26 and 27 and the top flange of bumper 14 are apertured in the same manner as sleeve members 16, 16 and the top flange of bumper 12, and bolts 24, 24 are similarly employed to secure the sleeve members 26 and 27 either in retracted positions, as shown in full view in Figure 4, or in outwardly extended positions, as shown in dotted view at the right side of Figure 4. In the outwardly-extended positions of the sleeve members, the respective pairs of support brackets 18 and 28 and 18 and 29 at the opposite sides of the truck are located in longitudinal planes spaced outwardly a substantial amount from the planes of the vehicle fenders so that the fenders and other vehicle parts, such as door handles, will not be damaged by lengths of pipe carried in said support brackets. When the truck is not being employed to carry pipe the sleeve members are secured in their retracted positions, as shown in Figures 2 and 4.

The U-shaped support brackets 28 and 29 have vertical bottom webs, shown at 30 and 31. Extending rearwardly from the lower portion of web 31 is a horizontal flange 32 on which is mounted a conventional chain vise 33 whose jaw portions 34 are aligned with the bracket 29. The vise 33 is braced to bracket 29 by a tie bar 35. As shown in Figure 5, the vise 33 may be employed to hold a length of pipe, such as shown in dotted view at 36, while the pipe is being cut or threaded, as required.

While a specific embodiment of an adjustable pipe rack and vise structure for motor trucks has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. Adjustable supporting means for a motor truck having a chassis, comprising a pair of laterally spaced horizontal longitudinal bars secured to the forward end of the chassis and extending longitudinally forwardly thereof, a substantially horizontal transverse bumper arranged adjacent to the forward ends of the bars and extending between the bars and laterally outwardly thereof, the length of the bumper being substantially the same as the width of the truck, the bumper being T-shaped in transverse cross section and including a vertical web secured to the forward ends of the bars and a horizontal web secured to the top of the vertical web and disposed above the bars and projecting forwardly and rearwardly of the vertical web, the horizontal web being provided forwardly of the vertical web with inner and outer longitudinally spaced openings, opposed elongated channel-shaped members slidably mounted upon the horizontal web for movement longitudinally thereof and including downturned sides for engagement with the longitudinal side edges of the horizontal web, the downturned sides being formed at their bottoms to provide lower inwardly extending flanges for engagement beneath the horizontal web, the channel-shaped members having openings adjacent to their inner ends for registration with the inner and outer openings of the horizontal web, bolts for engagement with the openings of the horizontal web and channel-shaped members for locking the members in the selected adjusted position, and upstanding support members secured to the tops of the channel-shaped members near their outer ends and projecting above the same.

2. Adjustable supporting means for a motor vehicle having a chassis, comprising pairs of laterally spaced horizontal longitudinal bars secured to the forward and rear ends of the chassis and extending longitudinally outwardly of the forward and rear ends of the chassis, substantially horizontal transverse bumpers arranged adjacent to the outer ends of the pairs of bars and extending between the bars and laterally outwardly thereof, the lengths of the bumpers being substantially equal to the width of the vehicle, the bumpers being T-shaped in transverse cross section and including vertical webs secured to the outer ends of the bars and horizontal webs secured to the tops of the vertical webs and disposed above the bars and projecting forwardly and rearwardly of the vertical webs, the horizontal webs being provided laterally outwardly of the vertical webs with inner and outer longitudinally spaced openings, opposed elongated channel-shaped plates slidably mounted upon the horizontal webs for movement longitudinally thereof and including integral depending sides for engagement about the longitudinal side edges of the horizontal webs and bottom longitudinal inwardly projecting flanges for engagement beneath the horizontal webs, the channel-shaped plates having openings adjacent to their inner ends for registration with the inner and outer openings of the horizontal webs, bolts for engagement with the openings of the horizontal webs and channel-shaped plates for locking such plates in selected adjusted positions upon the bumpers, and upstanding support members secured to the tops of the channel-shaped plates near their outer ends and projecting for substantial distances above the bumpers.

CLARENCE E. PAULEY.

REFERENCES CITED

The following references are of record in the file of this patent:

UNITED STATES PATENTS

| Number | Name | Date |
| --- | --- | --- |
| 1,497,564 | Howells | June 10, 1924 |
| 1,552,535 | Beerstecher | Sept. 8, 1925 |
| 1,633,497 | Schoelerman | June 21, 1927 |
| 2,228,593 | Dibble et al. | Jan. 14, 1941 |
| 2,425,656 | Tullis | Aug. 12, 1947 |
| 2,429,551 | Hitzemann | Oct. 21, 1947 |
| 2,432,732 | Del Cano | Dec. 16, 1947 |
| 2,439,707 | Wright | Apr. 13, 1948 |
| 2,447,771 | Rogers | Aug. 24, 1948 |